(12) United States Patent
Elliott et al.

(10) Patent No.: US 11,815,191 B2
(45) Date of Patent: Nov. 14, 2023

(54) ADJUSTABLE EROSION RESISTANT CHOKE VALVE

(71) Applicant: Cameron International Corporation, Houston, TX (US)

(72) Inventors: Declan Elliott, Longford (IE); James Kenny, Longford (IE); Jerry A. Martino, Houston, TX (US); Stuart Robinson, Katy, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 69 days.

(21) Appl. No.: 17/620,218

(22) PCT Filed: Jun. 26, 2020

(86) PCT No.: PCT/US2020/039825
§ 371 (c)(1),
(2) Date: Dec. 17, 2021

(87) PCT Pub. No.: WO2020/264298
PCT Pub. Date: Dec. 30, 2020

(65) Prior Publication Data
US 2022/0243836 A1 Aug. 4, 2022

Related U.S. Application Data

(60) Provisional application No. 62/891,905, filed on Aug. 26, 2019, provisional application No. 62/868,582, filed on Jun. 28, 2019.

(51) Int. Cl.
*F16K 25/04* (2006.01)
*E21B 34/02* (2006.01)
(Continued)

(52) U.S. Cl.
CPC ............ *F16K 25/04* (2013.01); *E21B 34/025* (2020.05); *F16K 3/06* (2013.01); *F16K 25/005* (2013.01); *F16K 31/12* (2013.01)

(58) Field of Classification Search
CPC ........ F16K 25/04; F16K 25/005; F16K 31/12; F16K 3/06; E21B 34/025
See application file for complete search history.

(56) References Cited

U.S. PATENT DOCUMENTS

| 293,240 A | 2/1884 | Goldsmith |
| 592,187 A | 10/1897 | Berr |
| (Continued) | | |

FOREIGN PATENT DOCUMENTS

| CN | 102200080 A | 9/2011 |
| JP | S52086835 U | 6/1977 |
| (Continued) | | |

OTHER PUBLICATIONS

International Search Report and Written Opinion; Application No. PCT/US2019/057372; dated Feb. 10, 2020; 12 pages.
(Continued)

*Primary Examiner* — Marina A Tietjen
(74) *Attorney, Agent, or Firm* — Jeffrey D. Frantz

(57) ABSTRACT

A choke valve includes a choke body and a choke trim disposed within the choke body. The choke trim also includes an insert defining a plurality of positive beans and a plate defining an aperture. The plate is configured to contact and to rotate relative to the insert to cover and uncover the plurality of positive beans to adjust a fluid flow through the choke valve.

19 Claims, 9 Drawing Sheets

(51) Int. Cl.
*F16K 3/06* (2006.01)
*F16K 25/00* (2006.01)
*F16K 31/12* (2006.01)

(56) References Cited

U.S. PATENT DOCUMENTS

| | | | |
|---|---|---|---|
| 2,209,992 A | 8/1940 | Mcgill | |
| 2,364,697 A | 12/1944 | Daniels | |
| 3,207,181 A * | 9/1965 | Elizabeth | F16K 3/08 251/208 |
| 3,273,592 A | 9/1966 | Deubler et al. | |
| 3,331,396 A * | 7/1967 | Elizabeth | E21B 34/02 251/368 |
| 3,372,709 A | 3/1968 | Dolter | |
| 3,426,797 A | 2/1969 | Baker | |
| 3,696,710 A | 10/1972 | Ortelli | |
| 3,707,169 A | 12/1972 | Friedrichs | |
| 4,098,294 A | 7/1978 | Woods | |
| 4,186,773 A | 2/1980 | Flynn | |
| 4,360,040 A | 11/1982 | Cove et al. | |
| 4,395,019 A | 7/1983 | Searles | |
| 4,431,028 A | 2/1984 | Hendrick | |
| 4,540,022 A | 9/1985 | Cove | |
| 4,596,377 A | 6/1986 | Taylor | |
| 4,603,834 A | 8/1986 | Hendrick | |
| 4,901,977 A | 2/1990 | Hendrick | |
| 5,020,568 A | 6/1991 | Taylor | |
| 5,025,832 A | 6/1991 | Taylor | |
| 5,025,833 A | 6/1991 | Hendrick | |
| 5,054,521 A | 10/1991 | Hendrick | |
| 5,063,954 A * | 11/1991 | Hendrick | F16K 3/08 251/118 |
| 5,088,688 A | 2/1992 | Knapp | |
| 5,088,689 A | 2/1992 | Hendricks et al. | |
| 5,217,046 A * | 6/1993 | Woods | F16K 27/045 137/625.3 |
| 5,365,978 A * | 11/1994 | Woods | F16K 3/08 137/454.6 |
| 5,409,351 A | 4/1995 | Geist | |
| 5,704,588 A | 1/1998 | Korfgen et al. | |
| 5,937,903 A | 8/1999 | Afshar et al. | |
| 6,193,213 B1 | 2/2001 | Stearns et al. | |
| 6,503,052 B1 | 1/2003 | Caillet | |
| 6,878,447 B2 | 4/2005 | Griffin et al. | |
| 7,631,505 B2 | 12/2009 | Seitz et al. | |
| 7,896,028 B2 | 3/2011 | Weyer, Jr. et al. | |
| 8,523,141 B2 | 9/2013 | Elliott et al. | |
| 8,601,992 B2 | 12/2013 | Fong et al. | |
| 8,602,113 B2 | 12/2013 | Jin et al. | |
| 8,627,893 B2 | 1/2014 | Otto et al. | |
| 8,876,081 B2 | 11/2014 | Tower | |
| 9,206,910 B2 | 12/2015 | Kahn et al. | |
| 9,212,543 B2 | 12/2015 | Stormoen et al. | |
| 9,410,396 B2 | 8/2016 | Mogedal | |
| 9,441,738 B2 | 9/2016 | Herrmann | |
| 9,476,509 B2 | 10/2016 | Tuineag et al. | |
| 9,534,476 B2 | 1/2017 | Kumar et al. | |
| 9,657,464 B2 | 5/2017 | Dunki-Jacobs et al. | |
| 9,677,378 B2 | 6/2017 | Asthana et al. | |
| 9,791,051 B2 | 10/2017 | Haldorsen et al. | |
| 9,816,348 B2 | 11/2017 | Asthana et al. | |
| 9,958,074 B2 | 5/2018 | Wan et al. | |
| 10,030,704 B2 | 7/2018 | Hall et al. | |
| 10,125,875 B2 | 11/2018 | Evans et al. | |
| 10,208,563 B2 | 2/2019 | Volent | |
| 10,330,217 B2 | 6/2019 | Elliott | |
| 10,358,899 B2 | 7/2019 | El Mallawany et al. | |
| 10,378,309 B2 | 8/2019 | Elliott et al. | |
| 10,480,282 B2 | 11/2019 | Quin et al. | |
| 10,683,895 B2 | 6/2020 | Hall et al. | |
| 10,830,359 B2 | 11/2020 | Miller et al. | |
| 10,871,234 B2 | 12/2020 | Miller et al. | |
| 10,941,870 B1 * | 3/2021 | Sonnier | F16K 35/00 |
| 2003/0024580 A1 | 2/2003 | Bohaychuk | |
| 2005/0115619 A1 | 6/2005 | Kawulka et al. | |
| 2009/0205728 A1 * | 8/2009 | Perez | F16K 3/085 137/625.3 |
| 2011/0042938 A1 | 2/2011 | Gallagher et al. | |
| 2013/0247995 A1 | 9/2013 | Ehrlich | |
| 2016/0215585 A1 | 7/2016 | Mullin et al. | |
| 2016/0281449 A1 | 9/2016 | Lorenson et al. | |
| 2017/0102084 A1 | 4/2017 | Bohaychuk et al. | |
| 2019/0078418 A1 | 3/2019 | Jones et al. | |

FOREIGN PATENT DOCUMENTS

| | | | | |
|---|---|---|---|---|
| JP | S62183175 U | 11/1987 | | |
| JP | H5001077 U | 1/1993 | | |
| JP | H5001778 A | 1/1993 | | |
| JP | 2002213642 A | 7/2002 | | |
| JP | 2003185036 A | 7/2003 | | |
| WO | 2015081432 A1 | 6/2015 | | |
| WO | WO-2018136846 A1 * | 7/2018 | | E21B 34/02 |
| WO | 2020181347 A1 | 9/2020 | | |

OTHER PUBLICATIONS

International Preliminary Report on Patentability of International Patent Application No. PCT/US2019/057372 dated May 6, 2021, 9 pages.

International Search Report and Written Opinion issued in PCT Application PCT/US2020/039825, dated Sep. 20, 2020 (10 pages).

International Search Report and Written Opinion issued in PCT Application PCT/US2017/041227, dated Sep. 28, 2017 (15 pages).

International Preliminary Report on Patentability issued in PCT Application PCT/US2017/041227, dated Jan. 8, 2019 (13 pages).

The Extended European Search Report issued in EP17825039.5 dated Feb. 17, 2020 (7 pages).

\* cited by examiner

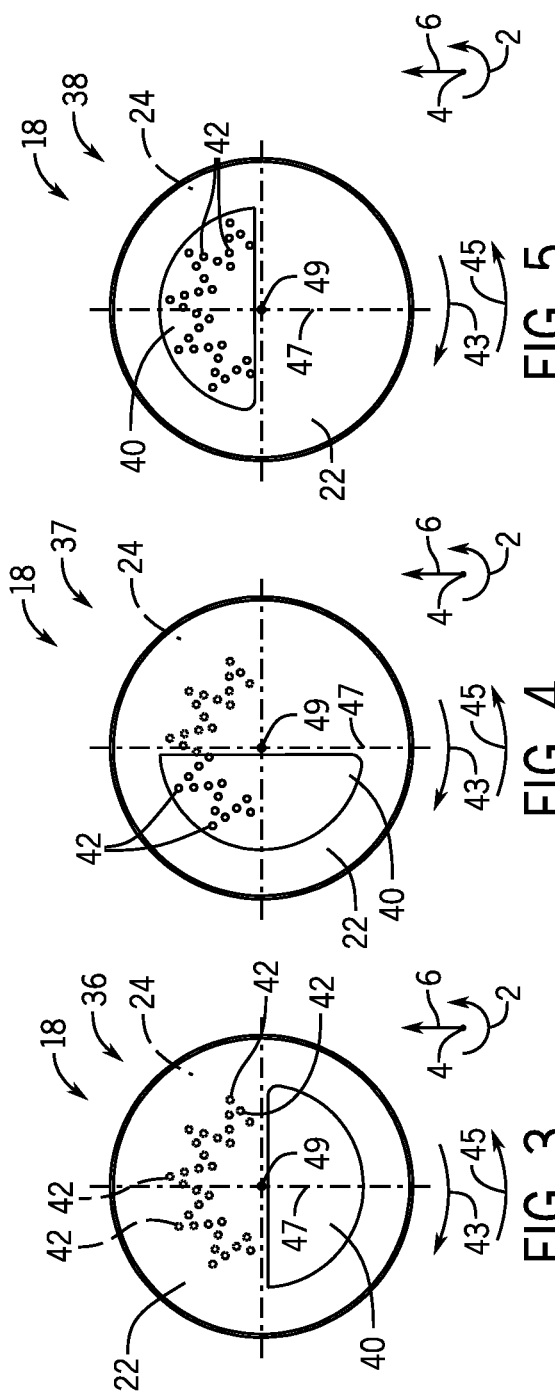
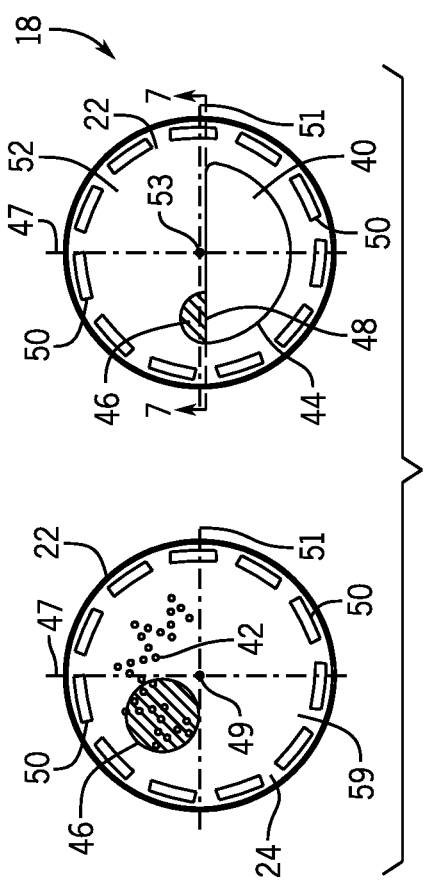

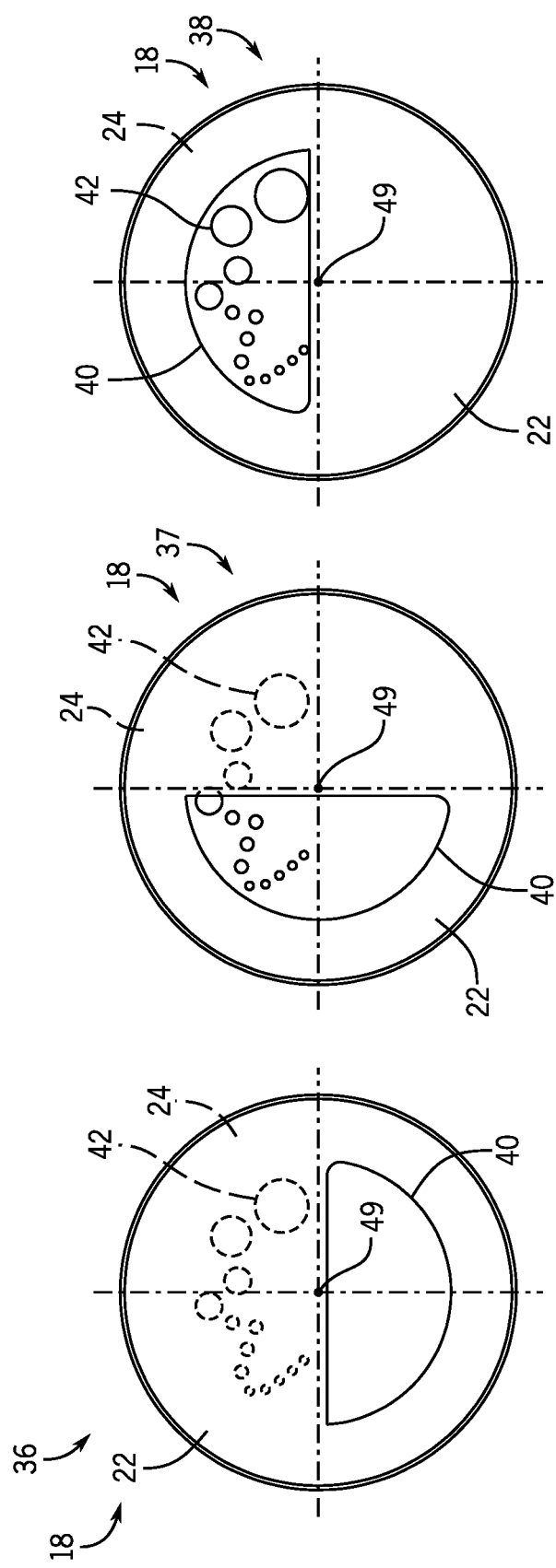

ADJUSTABLE EROSION RESISTANT CHOKE VALVE

CROSS-REFERENCE TO RELATED APPLICATIONS

This application claims priority to and the benefit of U.S. Provisional Application No. 62/868,582, entitled "ADJUSTABLE EROSION RESISTANT CHOKE VALVE," filed Jun. 28, 2019, and U.S. Provisional Application No. 62/891,905, entitled "ADJUSTABLE EROSION RESISTANT CHOKE VALVE," filed Aug. 26, 2019, which are hereby incorporated by reference in their entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In certain fluid-handling systems, such as mineral extraction systems, a variety of flow control devices are used to control a flow rate, a pressure, and other parameters of fluid flow. For example, choke valves may be utilized to regulate a flow of production fluid (e.g., oil, gas, and water) from a well. In choke valves, an actuator may drive a movable valve member over an opening through which the fluid flows. Shifting a position of the movable valve member relative to the opening adjusts the flow rate of the fluid through the opening. Unfortunately, the movable valve member may be subject to relatively high pressure drop environments, abrasive media entrained in the fluid, and/or fluid flow cavitation, which may lead to wear, erosion, and other degradation of the choke valve.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIG. 3 is a front view of a choke trim that may be used in a choke valve, wherein the choke trim is in a closed configuration, in accordance with an embodiment of the present disclosure;

FIG. 4 is a front view of the choke trim of FIG. 3, wherein the choke trim is in a partly-open configuration, in accordance with an embodiment of the present disclosure;

FIG. 5 is a front view of the choke trim of FIG. 3, wherein the choke trim is in a fully-open configuration, in accordance with an embodiment of the present disclosure;

FIG. 6 is front view of a plate and an insert of the choke trim of FIG. 3, in accordance with an embodiment of the present disclosure;

FIG. 7 is a cross-sectional side view of the plate of FIG. 6, in accordance with an embodiment of the present disclosure;

FIG. 8 is a front view of a choke trim that may be used in a choke valve, wherein the choke trim includes positive beans of various sizes and is in a closed configuration, in accordance with an embodiment of the present disclosure;

FIG. 9 is a front view of the choke trim of FIG. 8, wherein the choke trim is in a partly-open configuration, in accordance with an embodiment of the present disclosure;

FIG. 10 is front view of the choke trim of FIG. 8, wherein the choke trim is in a fully-open configuration, in accordance with an embodiment of the present disclosure;

DETAILED DESCRIPTION OF SPECIFIC EMBODIMENTS

Figure 1:
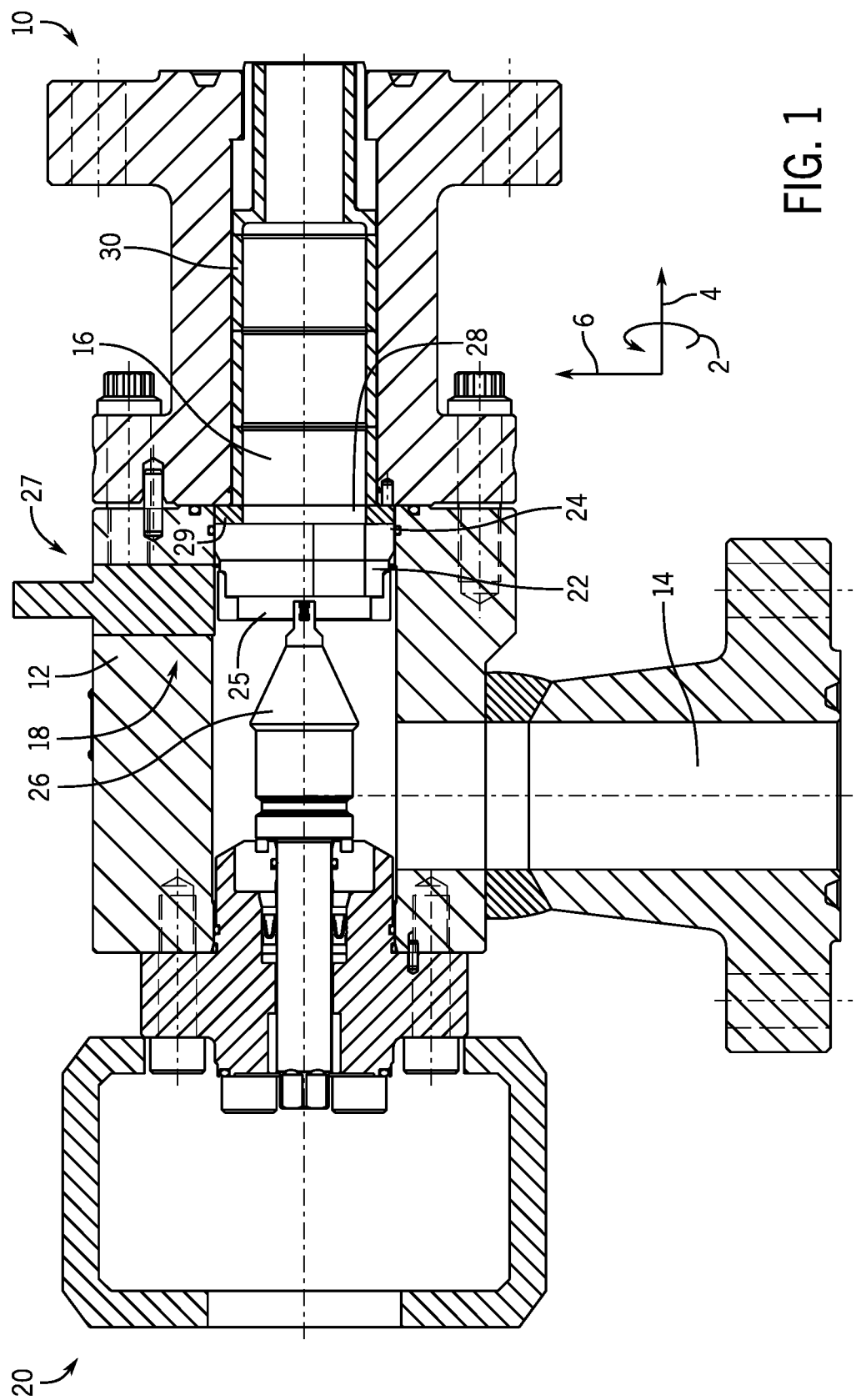
FIG. 1 is a cross-sectional view of a choke valve with a choke trim having a plate and an insert, wherein the plate is configured to rotate relative to the insert, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof.

Embodiments of the present disclosure are directed toward an adjustable erosion resistant choke valve. The adjustable erosion resistant choke valve may be used in a mineral extraction system (e.g., drilling system, hydraulic fracturing system), as well as in any other type of system. The choke valve includes a plate (e.g., rotating plate or disk) coupled to an insert (e.g., plate, disk, shaft). The plate defines one or more plate apertures, which open and close one or more insert apertures (e.g., positive beans) in the insert to control a flow of fluid through the choke valve. By including the insert with the positive beans, the choke valve increases its wear resistance over choke valves with variable apertures (e.g., as in a needle and seat choke trim). For example, variable apertures may increase in size due to erosion around inlets and outlets of the variable apertures, and thus, the increase in the size of the variable apertures may affect the flow of the fluid through the choke valve. However, the insert with the positive beans resists increases in size of the positive beans because the flow of the fluid would need to erode entire internal surfaces of the positive beans in order to increase the size of the positive beans and to change the flow of the fluid through the choke valve. Accordingly, by including the insert with the positive beans that are selectively covered and uncovered by the one or more plate apertures, the choke valve may provide increased wear resistance, and thus, may provide an operator with reliable control over the flow of the fluid through the choke valve for a longer period of time as compared to choke valves with variable apertures. The choke valve described below may therefore reduce a number of well shut-ins with their associated costs (e.g., spares, lost production during shut-in, risk to reservoir on shut-in, loss of estimated ultimate recovery (EUR)).

The use of positive beans in the choke valve may also enable use of a single choke valve (e.g., pressure drop device) on high pressure wells and/or erosive wells without a dual flow path setup or a number of chokes in series set-up. In a dual flow path set-up, flow can be diverted to either of two separate flow paths with isolation valves and choke valves on each flow path so that an eroded choke can be repaired while the other flow path continues flowing. In highly erosive environments with very high pressure drops, two or more chokes may be placed in series (e.g., variable aperture choke valves, positive bean choke valves, or a combination of both) to throttle to pressure in stages, thus reducing the erosion on individual chokes. The positive beans may also reduce fluid disturbance (e.g., jet impingement, swirling fluid flow), which may block and/or reduce pulverizing of sand and other particulates and/or erosion of conduit walls downstream of the choke valve. In some situations, less pulverization of sand and other particulates may facilitate separation of the sand and particulates from the fluid. Less fluid disturbance may also reduce mixing of multiphase fluids, which may facilitate separation of the different fluids (e.g., hydrocarbons from water). The term positive bean should be understood to mean an aperture (e.g., through hole) of fixed area (e.g., cross-sectional area) that extends through a part of the choke trim (e.g., an insert) that is used to control flow. The positive bean may have a dimension (e.g., diameter) between 1.25 to 16 centimeters (cm) (e.g., 0.5-6.5 inches (in)). In some embodiments, the positive bean may define a minimum length to diameter ratio. For example, the minimum length should be at least three times (3×) the diameter. In some embodiments, the length may be 4×, 5×, 6× or more than the diameter. The positive bean may be a generally round hole, but other shapes may also be used (e.g., semi-circular, oval shaped, irregular shape, square, moon shaped).

FIG. 1 illustrates an embodiment of a choke valve 10, which may be part of a mineral extraction system (e.g., hydrocarbon-production or processing system, such as a subsea or a surface oil or gas well). To facilitate discussion, the choke valve 10 and its components may be described with reference to a circumferential axis or direction 2, a longitudinal axis or direction 4, and a vertical axis or direction 6.

As shown, the choke valve 10 includes a body 12 that defines an inlet 14 and an outlet 16. A fluid passing through the inlet 14 may be at relatively high pressures, e.g., pressures greater than about 3.5 Megapascal (MPa) or 500 pounds per square inch (psi), 7 MPa or 1000 psi, 34 MPa or 5000 psi, 70 MPa or 10,000 psi, 100 MPa or 15,000 psi, 138 MPa or 20,000 psi, 172 MPa or 25,000 psi, or 206 MPa or 30,000 psi and may be carrying significant amounts of abrasive material (e.g., sand, ceramic, rock). For example, the fluid may carry significant amounts of sand from flow back after fracing a well. Without the present embodiments, this abrasive material may rapidly wear the choke valve and degrade its ability to control a flow of the fluid from the well.

As shown, the choke valve 10 includes a choke trim 18 disposed within the body 12 (e.g., right angled body, in-line body) and an actuator 20. The actuator 20 may modulate the flow of the fluid between the inlet 14 and the outlet 16 by adjusting the choke trim 18. The choke trim 18 includes a plate 22 (e.g., rotatable plate or disk; round, square, rectangular, irregular shaped) that rotates relative to an insert 24 (e.g., plate, disk, shaft; having one or more positive beans; round, square, rectangular, irregular shaped). In operation, the plate 22 may rotate relative to the insert 24 in the circumferential direction 2 to uncover or cover positive beans (e.g., apertures, through holes) in the insert 24, which may affect the flow of the fluid through the choke valve 10.

As illustrated, the actuator 20 is coupled to the plate 22 with a shaft 26. As the actuator 20 rotates the shaft 26, the shaft 26 rotates the plate 22 relative to the insert 24 to uncover or cover the positive beans in the insert 24. A bracket 25 (e.g., fork) may be positioned between the plate 22 and the shaft 26 and may couple the plate 22 to the shaft 26 (e.g., by extending radially-outwardly from the shaft 26 and by fastening to radially-outer edges of the plate 22). It should be appreciated that, in some embodiments, an actuator 27 may extend through a side wall (e.g., body wall) of the body 12. For example, the actuator 27 may be a linear actuator coupled to a lever, a gear drive rotating the plate 22, or another actuation assembly. It should also be appreciated that the shaft 26 and/or other components that couple the actuator 20 to the plate 22 (e.g., the bracket 25) may include coatings and/or coverings of erosion resistance material.

As noted above, the uncovering and covering of the positive beans in the insert 24 changes the flow of the fluid between the inlet 14 and the outlet 16 of the choke valve 10. In some embodiments, the plate 22 and the insert 24 may be interchangeable (e.g., the plate 22 may be positioned upstream or downstream of the insert 24 relative to the flow of the fluid from the inlet 14 to the outlet 16). The actuator 20 may be a manual actuator (e.g., a wheel), an electromechanical actuator (e.g., an electric drive or motor), a hydraulic actuator (e.g., a fluid driven actuator), a pneumatic actuator (e.g., a pressure drive actuator), or other suitable type of actuator.

The plate 22 and the insert 24 may be made out of tungsten carbide materials. Various alloys may be combined with tungsten carbide to produce materials of various hardness/erosion resistance. Higher hardness/erosion resistant grades may be more brittle. In some embodiments, a support plate 28 (e.g., ductile plate that is more ductile than the insert 24; annular plate) may therefore be placed downstream from the insert 24 to provide added support for the choke trim 18. In some embodiments, the plate 22 and/or the insert 24 may be manufactured from a superhard material (e.g., a diamond-based material, polycrystalline cubic boron nitride, a material with a hardness value exceeding approximately (e.g., within 1%-10%) 20 gigaPascals (GPa) based on the Vickers hardness test, and/or a material with a hardness value exceeding approximately (e.g., within 1%-10%) 4500 Hardness Brinell (HB) on the Brinell scale).

In some embodiments, the plate 22 may contact and seal against the insert 24. For example, the plate 22 may define a polished face that faces towards, contacts, and seals against a polished face of the insert 24. The ability of the plate 22 to seal against the insert 24 may reduce or block inadvertent flowby of the fluid through the choke valve 10. In some embodiments, a biasing member 29 (e.g., spring) may bias the plate 22 and the insert 24 together (e.g., in the absence of pressure in the choke valve 10) to form a seal between the plate 22 and the insert 24. Furthermore, because the rotating plate 22 and the insert 24 are biased against each other, the choke valve 10 may experience less vibration and may therefore be more robust. It should also be understood that in embodiments with or without the biasing member 29, a differential pressure across the choke trim 18 drives the plate 22 and the insert 24 together during operation, which reduces vibration and may increase robustness of the choke valve 10 by reducing relative movement between the plate 22 and the insert 24.

In some embodiments, one or more sleeves 30 (e.g., 1, 2, 3, 4, 5) may be included in the choke valve 10 to increase wear resistance of the choke valve 10. In other words, the one or more sleeves 30 may reduce wear of the body 12 from abrasive fluid flowing through the choke trim 18. It should be understood that the choke trim 18 may be swapped out for a different choke trim (e.g., a choke trim with differently sized and/or shaped positive beans) depending on a desired pressure drop and/or to replace worn components. For example, the plate 22 and/or the insert 24 may be swapped out.

Figure 2:
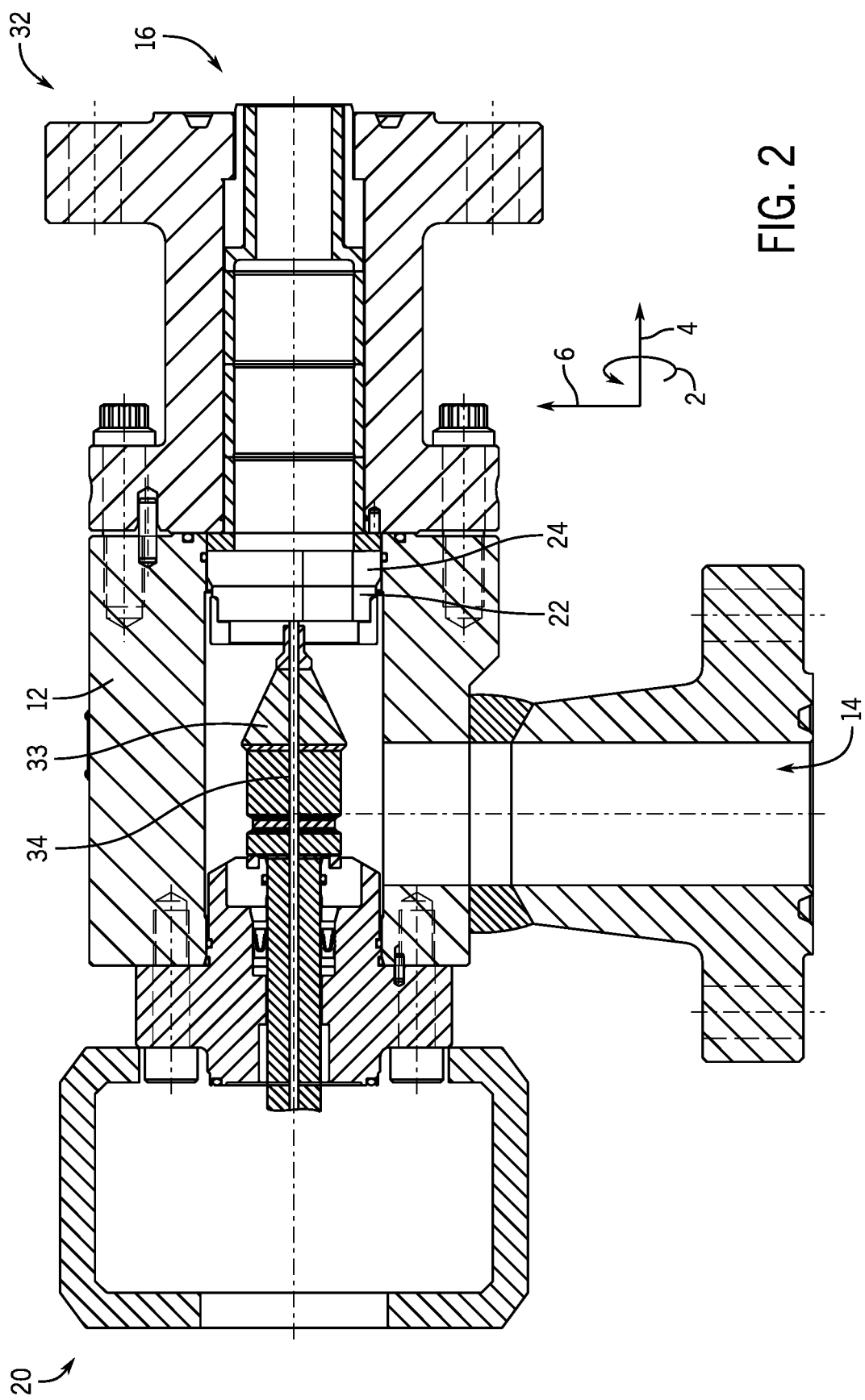
FIG. 2 is a cross-sectional view of a choke valve with a choke trim having a plate and an insert, wherein the plate and the insert are configured to rotate via respective shafts, in accordance with an embodiment of the present disclosure.

FIG. 2 is a cross-sectional view of the choke valve 32, wherein the choke valve 32 includes a first shaft 33 and a second shaft 34. The first shaft 33 is coupled to the plate 22 (e.g., non-rotatably coupled, so as to rotate together) to enable rotation of the plate 22 relative to the insert 24 and the body 12, and the second shaft 34 is coupled to the insert 24 (e.g., non-rotatably coupled, so as to rotate together) to enable rotation of the insert 24 relative to the plate 22 and the body 12. As illustrated, the second shaft 34 may be coaxial with and extend through the first shaft 33. The actuator 20 may rotate the first shaft 33 and/or the second shaft 34 independently of one another (e.g., one at a time; at the same time, but at different rotational rates and/or in different rotational directions), which drives the rotation of the plate 22 and/or the insert 24. In this way, the plate 22 and/or the insert 24 may rotate relative to each other and relative to the body 12 to control the flow of fluid through the choke valve 32. The choke valve 32 in FIG. 2 may have any of the features of the choke valve 32 of FIG. 1, but with the shaft 26 of the choke valve 32 of FIG. 1 replaced with the first shaft 33 of FIG. 2 that surrounds the second shaft 34 of FIG. 2 or with the addition of the second shaft 34 of FIG. 2 or some other drive mechanism to drive rotation of the insert 24 relative to the plate 22 and the body 12. For example, in some embodiments, the second shaft 34 may be coupled to the insert 24 through a downstream (e.g., relative to a direction of flow between the inlet 14 and the outlet 16; between the insert 24 and the outlet 16) aperture or bore in the body 12.

FIGS. 3-5 each illustrate a front view (e.g., with respect to a direction of flow through the choke trim 18) of the choke trim 18 having the plate 22 and the insert 24. In FIG. 3, the plate 22 and the insert 24 are in a closed configuration 36 in which an aperture 40 (e.g., through hole; semi-circular) in the plate 22 does not uncover (e.g., does not overlap or is misaligned along the longitudinal axis 4) positive beans 42 in the insert 24. In FIG. 4, the plate 22 and the insert 24 are in a partly-open configuration 37 in which the aperture 40 in the plate 22 uncovers (e.g., overlap or aligned along the longitudinal axis 4) some of the positive beans 42 in the insert 24. In FIG. 5, the plate 22 and the insert 24 are in a fully-open configuration 38 in which the aperture 40 in the plate 22 uncovers all of the positive beans in the insert 24. It should be appreciated that the plate 22 may be rotated and held relative to the insert 24 to achieve any partly-open configuration between the closed configuration 36 and the fully-open configuration 38 (e.g., to uncover any number of the positive beans 42). Any partly-open configuration and the fully-open configuration 38 may be referred to herein as an open configuration.

To move between the closed configuration 36 and the fully-open configuration 38, the plate 22 may rotate relative to the insert 24. As the plate 22 rotates relative to the insert 24 in a first direction 43 from the closed configuration 36 to the fully-open configuration 38, the plate 22 uncovers the positive beans 42 in the insert 24, which changes the flow of the fluid through the choke trim 18. In the illustrated embodiment, as the plate 22 rotates relative to the insert 24 in the first direction 43 from the closed configuration 36 to the fully-open configuration 38, the plate 22 uncovers an increasing number of the positive beans 42 in the insert 24 and results in an increase in the flow of the fluid through the choke trim 18.

To move from the fully-open configuration 38 to the closed configuration 36, the plate 22 may rotate relative to the insert 24 in the first direction 43 or in a second direction 45 that is opposite the first direction 43. Thus, the plate 22 may rotate back and forth through an angle of 180 degrees or in complete revolutions through an angle of 360 degrees to uncover and cover the positive beans 42 in the insert 24 during operations.

While the plate 22 is shown as moving in the first direction 43 to adjust from the closed configuration 36 to the fully-open configuration 38 to facilitate discussion, it should be understood that the plate 22 may rotate in the second direction 45 to adjust from the closed configuration 36 to the fully-open configuration 38. Furthermore, the plate 22 may alternate or switch its direction of rotation (e.g., rotate in the first direction 43 to adjust from the closed configuration 36 to the fully-open configuration 38 during a first operation or time period and rotate in the second direction 45 to adjust from the closed configuration 36 to the fully-open configuration 38 during a second operation or time period). This may increase an operating life of the choke trim 18 by alternating which positive beans 42 are uncovered (e.g., first uncovered as the plate 22 moves from the closed configuration 36 to the fully-open configuration 38; uncovered in the partly-open configuration 35). For example, if the plate 22 rotates in the first direction 43 from the closed configuration 36, a first set of the positive beans 42 on a first side of a first axis 47 of the choke trim 18 may be uncovered. Then, if the plate 22 rotates in the second direction 45 from the closed configuration 36, a second set of the positive beans on a second side of the first axis 47 will be uncovered. It should be appreciated that other techniques may be employed to increase the operating life of the choke trim 18. For example, the plate 22 and/or insert 24 may be flipped (e.g., manually rotated 180 degrees about the first axis 47) so that a surface that initially faces downstream during a first operation or time period, then faces upstream relative to the direction of the flow of the fluid across the choke trim 18 during a second operation or time.

In FIGS. 3-5, an arrangement of the positive beans 42 on the first side of the first axis 47 may be the same as an arrangement of the positive beans on the second side of the first axis 47 (e.g., symmetrical about the first axis 47). However, in some embodiments, the respective arrangements of the positive beans 42 may vary on the first side and the second side (e.g., asymmetric about the first axis 47). As discussed in more detail below, in such cases, the choke trim 18 may create different flow characteristics by rotating in the first direction 43 versus rotating in the second direction 45 from the closed configuration 36. Furthermore, in FIGS. 3-5, the positive beans 42 define a similar diameter and shape. As shown, the positive beans 42 may be arranged in angular planes (e.g., triangular or star-shaped patterns; with some positive beans 42 closer to a center portion 49, which may have a center axis, of the insert 24 and some positive beans further from the center portion 49 of the insert 24 with respect to a radial direction from the center portion 49 to a radially-outer edge of the insert 24) in the insert 24 to adjust the flow of the fluid in a desirable manner. This staggered and radially-offset configuration of the positive beans 42 may spread or distribute wear due to the flow of the fluid to different portions of the plate 22 (e.g., along a length of a leading edge of the plate 22) and/or the insert 24. This staggered and circumferentially-offset configuration of the positive beans 42 may block partial uncovering of any one of the positive beans 42. In other words, uncovering one positive bean 42 may not involve partially uncovering another positive bean 42. Each of the positive beans 42 may therefore be completely uncovered or completely covered, which may provide desirable flow characteristics for the choke trim 18.

It should be appreciated that any of the variations discussed herein may be applied to the choke trim 18 of FIGS. 3-5. For example, as discussed above with respect to FIG. 2, the insert 24 may rotate relative to the plate 22. The choke trim 18 may be positioned within the body of the choke valve in any suitable orientation, such as, but not limited to, with the first axis 47 generally aligned with the vertical axis 6 of the choke valve and with the positive beans 42 in the insert 24 being generally positioned above the aperture 40 in the plate 22 along the vertical axis 6 of the choke valve while the choke trim 18 is in the closed configuration 36.

FIG. 6 is a front view of the plate 22 and the insert 24 of the choke trim 18, wherein the plate 22 and the insert 24 are separated from one another and each include an erosion-resistant portion 46 (e.g., coating or insert). FIG. 7 is a cross-sectional side view of the plate 22 with the erosion-resistant portion 46. FIG. 7 is taken through line 7-7 of FIG. 6. As illustrated, the plate 22 defines the aperture 40 that enables the plate 22 to cover and uncover the positive beans 42 in the insert 24. While the aperture 40 in the plate 22 is shown as semi-circular, it should be appreciated that the aperture 40 may have a different shape, such as a crescent shape, a square shape, an irregular shape, or the like. Furthermore, while the aperture 40 is illustrated as symmetric about the first axis 47, it should be appreciated that the aperture 40 may be asymmetric about the first axis 47. The aperture 40 is also shown as being positioned on a first side of a second axis 51 of the choke trim 18 that is perpendicular to the first axis 47, and a solid surface 52 (e.g., insert-contacting surface) is positioned on a second side of the second axis 51. In the illustrated embodiment, the first axis 47 and the second axis 51 intersect at a center portion 53 (e.g., center axis) of the plate 22. The center portion 49 of the insert 24 and the center portion 53 of the plate 22 may be aligned within one another when the insert 24 and the plate 22 are jointed together to form the choke trim 18 for the choke valve.

The aperture 40 may be defined by a perimeter 44 (e.g., boundary). In some embodiments, the erosion-resistant portion 46 may be positioned along the perimeter 44. For example, the erosion-resistant portion 46 may define all of or a portion of a leading edge 48 of the perimeter 44 that uncovers the positive beans 42 as the choke trim 18 adjusts from the closed configuration toward the fully-open configuration. This position may be advantageous as the leading edge 48 may experience more erosion than other portions of the perimeter 44. The erosion-resistant portion 46 may be made from a material that is different than and is more erosion resistant than the rest of the plate 22. For example, the erosion-resistant portion 46 may be made from a super-hard material (e.g., a diamond-based material, polycrystalline cubic boron nitride, a material with a hardness value exceeding approximately (e.g., within 1%-10%) 20 gigaPascals (GPa) based on the Vickers hardness test, and/or a material with a hardness value exceeding approximately (e.g., within 1%-10%) 4500 Hardness Brinell (HB) on the Brinell scale).

As noted above, at certain times, the choke trim 18 may be in the partly-open configuration in which a portion of the positive beans 42 are uncovered. In the partly-open configuration, the plate 22 may uncover only a portion of one positive bean 42 and the erosion-resistant portion 46 may cover the remainder of the one positive bean 42 to thereby provide erosion resistance and increase the operating life of the plate 22 (e.g., as compared to the plate 22 without the erosion-resistant portion 46). However, it should be appreciated that the plate 22 may be rotated through fixed positions to block and/or reduce situations where only a portion of a positive bean(s) is uncovered. For example, the plate 22 may be rotated only through fixed angles (e.g., 5, 10, 15, 20, 25 degrees) that correspond to positions in which the plate 22 does not leave only a portion of a positive bean(s) uncovered. In this way, the positive beans 42 may not be partially throttled, which may reduce erosion and increase the operating life of the plate 22.

It should be appreciated that the erosion-resistant portion 46 may have any suitable shape, such as a semi-circular shape, circular shape, rectangular shape, or the like. Furthermore, the erosion-resistant portion 46 may have any suitable position and/or more than one erosion-resistant portion 46 may be provided on the plate. For example, the erosion-resistant portion 46 may extend along an entirety of the leading edge 48. As another example, the erosion-resistant portion 46 may be positioned on a first side of the first axis 47 to protect the perimeter 44 as the plate 22 rotates in a first direction from the closed configuration, and another erosion-resistant portion 46 may be positioned on a second side of the first axis 47 (e.g., symmetrical about the first axis 47) to protect the perimeter 44 as the plate 22 rotates in a second direction from the closed configuration. In some embodiments, an entirety of the plate 22 may be made from a superhard material (e.g., a diamond-based material, polycrystalline cubic boron nitride, a material with a hardness value exceeding approximately (e.g., within 1%-10%) 20 gigaPascals (GPa) based on the Vickers hardness test, and/or a material with a hardness value exceeding approximately (e.g., within 1%-10%) 4500 Hardness Brinell (HB) on the Brinell scale).

With reference to FIG. 7, the erosion-resistant portion 46 may also extend completely through the plate 22 or partially through the plate 22 between opposing surfaces (e.g., the solid surface 52 and a surface 57) of the plate 22. As shown, the erosion-resistant portion 46 may be flush with the solid surface 52 so as to slide along and contact the insert 24 during operation. In some embodiments, the erosion-resistant portion 46 and/or the leading edge 48 may shear or breakup particulates that would otherwise block or reduce the flow of the fluid through the insert 24. In other words, the choke trim 18 may facilitate clearance of blockages during operation and without disassembly of the choke valve.

As shown in FIG. 6, the insert 24 may also include its own erosion-resistant portion 46. As illustrated, the insert 24 defines the positive beans 422 that are covered and uncovered by the aperture 40 in the plate 22. The positive beans 42 are shown as being positioned on a first side of the second axis 51 that is perpendicular to the first axis 47, and a solid surface 59 (e.g., plate-contacting surface) is positioned on a second side of the second axis 51. In the illustrated embodiment, the first axis 47 and the second axis 51 intersect at the center portion 49 (e.g., center axis) of the insert 24.

The erosion-resistant portion 46 may be positioned about (e.g., to surround) some of all of the positive beans 42. For example, the erosion-resistant portion 46 may be positioned about some of the positive beans 42 that are first uncovered by the plate 22 as the choke trim 18 adjusts from the closed configuration. This position may be advantageous as this portion of the insert 24 may experience more erosion than other portions of the insert 24 (e.g., due to more frequently exposure to and contact with the fluid). The erosion-resistant portion 46 may be made from a material that is different than and is more erosion resistant than the rest of the insert 24. For example, the erosion-resistant portion 46 may be made from a superhard material (e.g., a diamond-based material, polycrystalline cubic boron nitride, a material with a hardness value exceeding approximately (e.g., within 1%-10%) 20 gigaPascals (GPa) based on the Vickers hardness test, and/or a material with a hardness value exceeding approximately (e.g., within 1%-10%) 4500 Hardness Brinell (HB) on the Brinell scale).

It should be appreciated that the erosion-resistant portion 46 may have any suitable shape, such as a semi-circular shape, circular shape, arc shape, rectangular shape, or the like. Furthermore, the erosion-resistant portion 46 may have any suitable position and/or more than one erosion-resistant portion 46 may be provided on the plate. For example, the erosion-resistant portion 46 may extend about all of the positive beans 42 in an arc shape. As another example, the erosion-resistant portion 46 may be positioned on a first side of the first axis 47 to protect the a first portion of the positive beans 42 that are first uncovered as the plate 22 rotates in a first direction from the closed configuration, and another erosion-resistant portion 46 may be positioned on a second side of the first axis 47 (e.g., symmetrical about the first axis 47) to protect a second portion of the positive beans 42 that are first uncovered as the plate 22 rotates in a second direction from the closed configuration. In some embodiments, an entirety of the insert 24 may be made from a superhard material (e.g., a diamond-based material, polycrystalline cubic boron nitride, a material with a hardness value exceeding approximately (e.g., within 1%-10%) 20 gigaPascals (GPa) based on the Vickers hardness test, and/or a material with a hardness value exceeding approximately (e.g., within 1%-10%) 4500 Hardness Brinell (HB) on the Brinell scale). The erosion-resistant portion 46 of the insert 24 may also extend completely through the insert 24 or partially through the insert 24. The erosion-resistant portion 46 may be configured to slide along and contact the plate 22 during operation. In some embodiments, the erosion-resistant portion 46 of the insert 24 may shear or breakup particulates that would otherwise block or reduce the flow of the fluid through the insert 24. In other words, the choke trim 18 may facilitate clearance of blockages during operation and without disassembly of the choke valve.

As shown, the plate 22 and/or the insert 24 may include one or more recesses 50 and/or other features that facilitate pressure balancing and reduce face-to-face loading. For example, multiple recesses 50 may be uniformly sized and spaced about a respective radially-outer portion of the plate 22 and/or a respective radially-outer portion of the insert 24. In some embodiments, the multiple recesses 50 may not be uniformly sized and/or spaced. For example, one or more recesses 50 may be positioned on an opposite side (e.g., diametrically opposed) of the second axis 51 from the aperture 40 of the plate 22 and/or from the positive beans 42 of the insert 24. The one or more recesses 50 and/or features may reduce the torque used to rotate the plate 22 relative to the insert 24.

FIGS. 8-10 each illustrate a front view of the choke trim 18 having the plate 22 and the insert 24, wherein the positive beans 42 in the insert 24 are of various sizes (e.g., diameter or cross-sectional area; a first positive bean has a first size, a second positive bean has a second size different from the first size, a third positive bean has a third size different from the first size and the second size, and so forth). In FIG. 8, the plate 22 and the insert 24 are in the closed configuration 36 in which the aperture 40 in the plate 22 does not uncover the positive beans 42 in the insert 24. In FIG. 9, the plate 22 and the insert 24 are in the partly-open configuration 37 in which the aperture 40 in the plate 22 uncovers some of the positive beans 42 in the insert 24. In FIG. 10, the plate 22 and the insert 24 are in the fully-open configuration 38 in which the aperture 40 in the plate 22 uncovers all of the positive beans in the insert 24. It should be appreciated that the plate 22 may be rotated and held relative to the insert 24 to achieve any partly-open configuration between the closed configuration 36 and the fully-open configuration 38 (e.g., to uncover any number of the positive beans 42).

The choke trim 18 of FIGS. 8-10 may operate in the manner discussed above with respect to the choke trim 18 of FIGS. 3-5 and may include the erosion-resistant portion(s) 46 discussed above with respect to FIGS. 6 and 7. However, in FIGS. 8-10, the positive beans 42 have similar shapes (e.g., a circular cross-sectional shape), but different sizes. Thus, the flow of the fluid through the choke trim 18 may increase more rapidly with small angular changes of the plate 22 (e.g., more rapidly per degree of change between the partly-open configuration 37 and the fully-open configuration 38, as compared to per degree of change between the closed-configuration 36 and the partly-open configuration 37; more rapidly through certain angles as compared to the choke trim of FIGS. 3-7). In some embodiments, some of the positive beans 42 (e.g., the smaller positive beans 42) may be used to adjust the flow of the fluid through the choke trim 18, while some of the positive beans (e.g., the larger positive beans 42, or a largest one of the positive beans 42) may be uncovered to clear blockages without disassembling the choke valve 10 (e.g., upon command; upon detection of blockages). As shown, the positive beans 42 may be in angular planes and a staggered arrangement (e.g., triangular or star-shaped patterns; with some positive beans 42 closer to the center portion 49 of the insert 24 and some positive beans further from the center portion 49 of the insert 24 with respect to the radial direction from the center portion 49 to the radially-outer edge of the insert 24; radially-offset and circumferentially-offset) in the insert 24 to adjust the flow of the fluid in a desirable manner.

Figure 13:
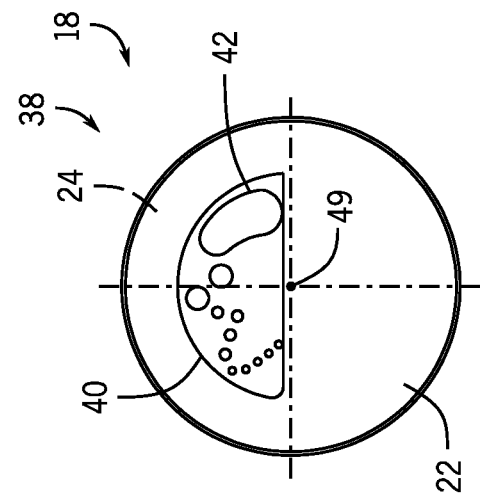
FIG. 13 is a front view of the choke trim of FIG. 11, wherein the choke trim is in a fully-open configuration, in accordance with an embodiment of the present disclosure.
Figure 12:
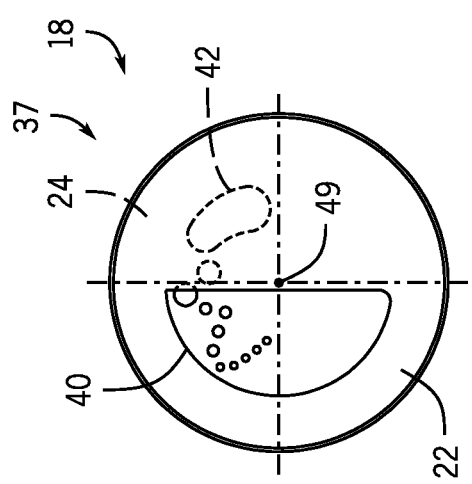
FIG. 12 is a front view of the choke trim of FIG. 11, wherein the choke trim is in a partly-open configuration, in accordance with an embodiment of the present disclosure.
Figure 11:
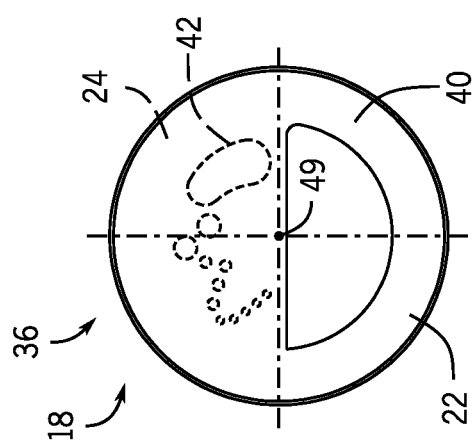
FIG. 11 is a front view of a choke trim that may be used in a choke valve, wherein the choke trim includes positive beans of various shapes and is in a closed configuration, in accordance with an embodiment of the present disclosure.

FIGS. 11-13 each illustrate a front view of the choke trim 18 having the plate 22 and the insert 24, wherein the positive beans 42 in the insert 24 are of various sizes and various shapes. In FIG. 11, the plate 22 and the insert 24 are in the closed configuration 36 in which the aperture 40 in the plate 22 does not uncover the positive beans 42 in the insert 24. In FIG. 10, the plate 22 and the insert 24 are in the partly-open configuration 37 in which the aperture 40 in the plate 22 uncovers some of the positive beans 42 in the insert 24. In FIG. 11, the plate 22 and the insert 24 are in the fully-open configuration 38 in which the aperture 40 in the plate 22 uncovers all of the positive beans in the insert 24. It should be appreciated that the plate 22 may be rotated and held relative to the insert 24 to achieve any partly-open configuration between the closed configuration 36 and the fully-open configuration 38 (e.g., to uncover any number of the positive beans 42).

The choke trim 18 of FIGS. 8-10 may operate in the manner discussed above with respect to the choke trims 18 of FIGS. 3-5 and 8-10 and may include the erosion-resistant portion(s) 46 discussed above with respect to FIGS. 6 and 7. However, in FIGS. 11-13, the positive beans 42 have different sizes and different shapes. Thus, the flow of the fluid through the choke trim 18 may increase more rapidly with small angular changes of the plate 22. In some embodiments, some of the positive beans 42 (e.g., the smaller positive beans 42) may be used to adjust the flow of the fluid through the choke trim 18, while some of the positive beans (e.g., the larger positive beans 42, or a largest one of the positive beans 42) may be uncovered to clear blockages without disassembling the choke valve 10 (e.g., upon command; upon detection of blockages). In the illustrated embodiment, one of the positive beans 42 (e.g., the largest one of the positive beans 42) has an oblong (e.g., curved, arc) shape, and the remainder of the positive beans 42 have a circular cross-sectional shape. However, any combination of different sizes and shapes are envisioned (e.g., multiple positive beans 42 with the oblong shape or other shape). As shown, the positive beans 42 may be in angular planes and a staggered arrangement (e.g., triangular or star-shaped patterns; with some positive beans 42 closer to the center portion 49 of the insert 24 and some positive beans further from the center portion 49 of the insert 24 with respect to the radial direction from the center portion 49 to the radially-outer edge of the insert 24; radially-offset and circumferentially-offset) in the insert 24 to adjust the flow of the fluid in a desirable manner.

Figure 14:
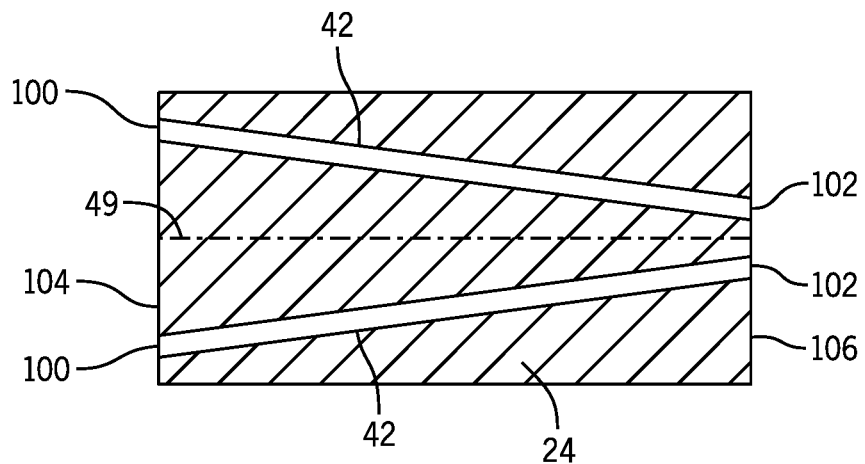
FIG. 14 is a cross-sectional side view of an insert that may be used in a choke trim of a choke valve, wherein the insert includes positive beans that are angled toward one another, in accordance with an embodiment of the present disclosure.

FIG. 14 is a cross-sectional view of the insert 24 having the positive beans 42. As illustrated, one or more of the positive beans 42 may be angled from a first end 100 (e.g., inlet) to a second end 102 (e.g., outlet). When installed as part of the choke trim and/or within the choke valve, the first ends 100 may be positioned at a first surface 104 (e.g., plate contacting surface) of the insert 24, and the second end s102 may be positioned at a second surface 106 that is opposite the first surface 104. Furthermore, the first ends 100 may be positioned upstream of the second ends 102 relative to the direction of the flow of the fluid through the insert 24 and the choke trim within the choke valve. Thus, the positive beans 42 may be angled so that their respective second ends 102 are closer to one another (e.g., and closer to the center portion 49) than their respective first ends 101.

By angling the positive beans 42 in this manner, the insert 24 may direct the fluid (which may be abrasive) away from walls of the choke valve that are positioned downstream of the insert 24 (e.g., relative to the direction of the flow of the fluid). In other words, the insert 24 may reduce wear on the choke valve and/or other components (e.g., conduits) downstream of the insert 24 by controlling how the fluid exits the insert 24.

Figure 15:
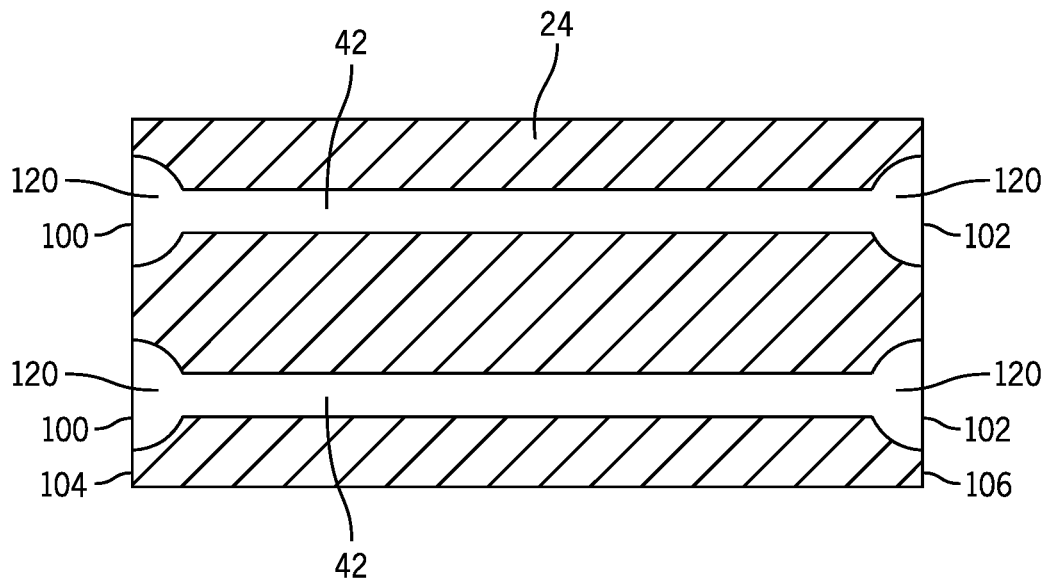
FIG. 15 is a cross-sectional view of an insert that may be used in a choke trim of a choke valve, wherein the insert includes positive beans with diffusers, in accordance with an embodiment of the present disclosure.

FIG. 15 is a cross-sectional view of the insert 24 having the positive beans 42. As illustrated, diffusers 120 (e.g., radially-expanded portions) may be positioned along the positive beans 42, such as at the first ends 100 and/or the second ends 102 of one or more of the positive beans 42. When installed as part of the choke trim and/or within the choke valve, the first ends 100 may be positioned at the first surface 104 of the insert 24, and the second ends 102 may be positioned at the second surface 106 that is opposite the first surface 104. In operation, the diffusers 120 may reduce turbulence of the flow of the fluid, reduce erosion of the insert 24 (e.g., at an inlet or upstream end) to the positive beans 42, and reduce erosion of components downstream of the insert 24 (e.g., support plate 28).

Figure 16:
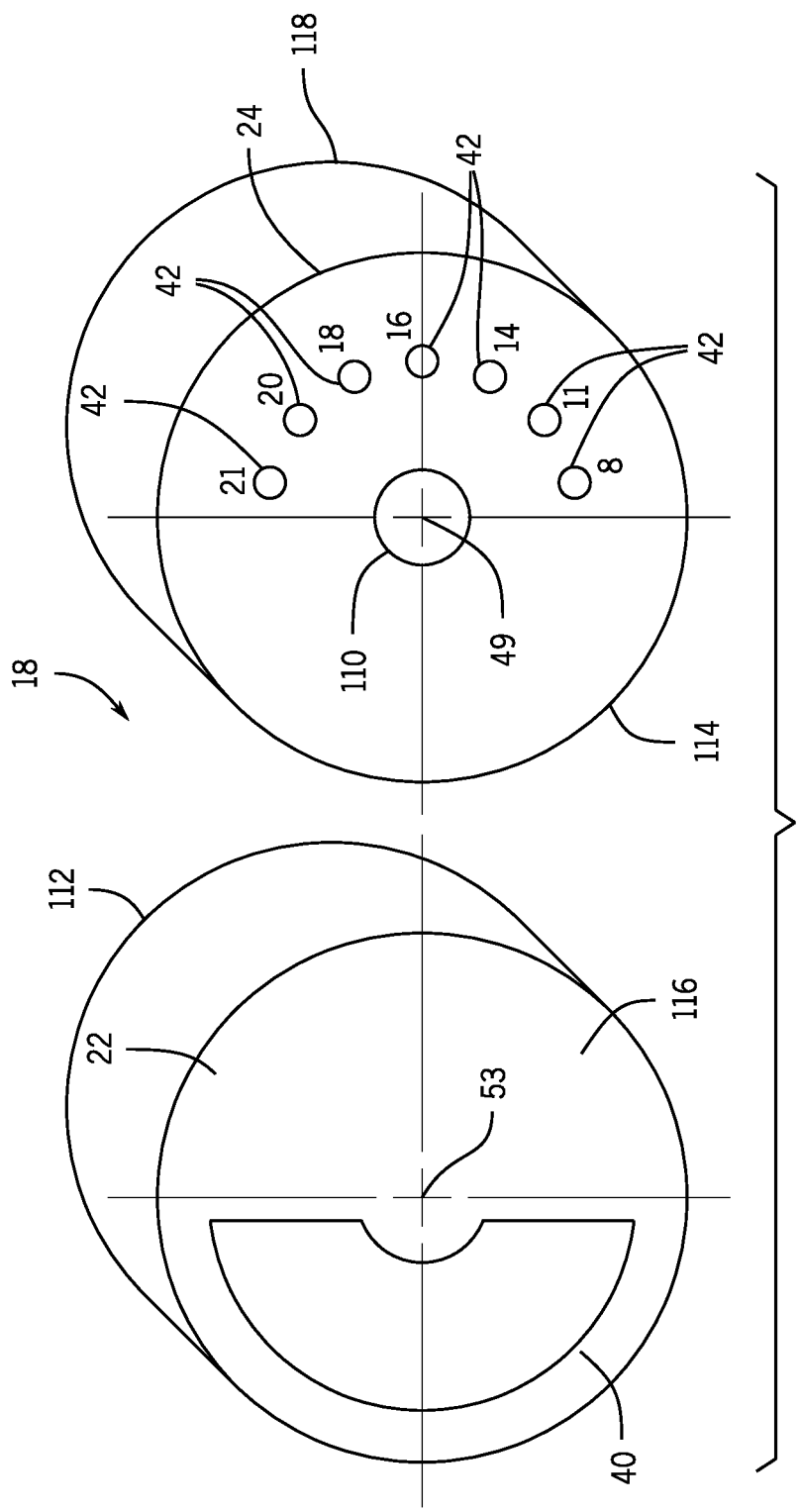
FIG. 16 is a perspective front view of a choke trim that may be used in a choke valve, wherein the choke trim includes a plate and an insert, and the insert includes through apertures that are configured to affect a seal between the plate and the insert, in accordance with an embodiment of the present disclosure.

FIG. 16 illustrates a perspective front view of the plate 22 and the insert 24 of the choke trim 18, wherein the insert 24 includes one or more apertures 110 (e.g., through holes). The choke trim 18 of FIG. 16 may operate in the manner discussed above with respect to the choke trim 18 of FIGS. 3-5, for example, and may include the erosion-resistant portion(s) 46 discussed above with respect to FIGS. 6 and 7. In particular, the plate 22 is configured to rotate with respect to the insert 24 to cover and uncover the positive beans 42 in the insert 24.

In operation, a first surface 112 (e.g., insert contacting surface) of the plate 22 is configured to for a seal against a first surface 114 (e.g., plate contacting surface) of the insert 24 (i.e., in the direction of flow). The seal may be formed by a differential pressure between a pressure acting on a second surface 116 of the plate 22 and a pressure acting on a second surface 118 of the insert 24. As an example, if the choke trim 18 is installed in the choke valve with the plate 22 upstream of the insert 24 relative to the direction of the flow of fluid, then the second surface 116 of the plate 22 may be exposed to and acted upon by the pressure upstream of the choke trim 18 (e.g., at the inlet of the choke valve), and the second surface 118 of the insert 24 may be exposed to and acted upon by the pressure downstream of the choke trim 18 (e.g., at the outlet of the choke valve).

In some embodiments, the choke trim 18 may increase the pressure differential via one or more apertures 110 (e.g., 1, 2, 3, 4, 5) in the insert 24 that reduce a surface area of the second surface 118 of the insert 24, and thus, reduce a force generated via application of the pressure on the second surface 118 of the insert 24. It should be understood that these apertures 110 are not exposed by the aperture 40 in the plate 22 during operation. In other words, the apertures 110 are separate from the positive beans 42 and are not uncovered or exposed as the plate 22 rotates relative to the insert 24. Instead, the apertures 110 remain covered by the plate 22. For example, the apertures 110 are located at the center portion 49 of the insert 24 and may remain covered by a solid surface at the center portion 53 of the plate 22 as the plate rotates relative to the insert 24. It should be appreciated that the apertures for this purpose may alternatively be included in the plate 22. By increasing the pressure differential in this way, the choke trim 18 may be able to form and maintain the seal between the plate 22 and the insert 24.

Figure 17:
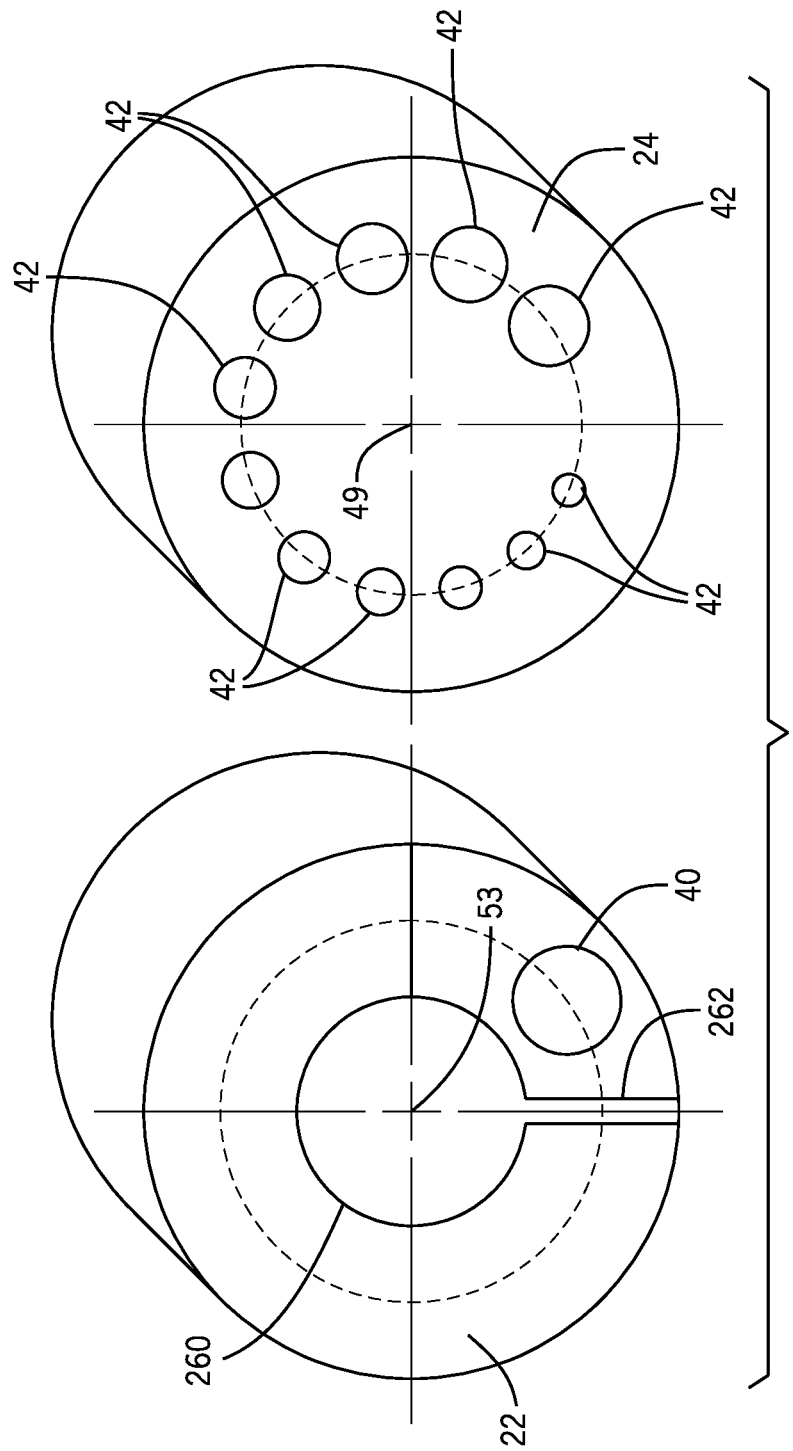
FIG. 17 is a perspective rear view of a plate and a perspective front view of an insert of a choke trim that may be used in a choke valve, wherein the plate includes an aperture that is configured to uncover one positive bean of the insert at a time, in accordance with an embodiment of the present disclosure.

FIG. 17 illustrates a perspective rear view of the plate 22 and a perspective front view of the insert 24 of the choke trim 18, wherein the plate 22 includes the aperture 40 that is configured to uncover one positive bean 42 in the insert 24 at a time. The choke trim 18 of FIG. 16 may otherwise operate in the manner discussed above with respect to the choke trim 18 of FIGS. 3-5, for example, and may include the erosion-resistant portion(s) 46 discussed above with respect to FIGS. 6 and 7.

As illustrated, the insert 24 includes multiple positive beans 42 that are arranged in a circumferentially-offset (e.g., spaced apart about a circumference of the insert 24) manner and that progressively increase in size about the circumference of the insert 24. These positive beans 42 may be individually (e.g., one at a time) exposed by the aperture 40 in the plate 22. A size (e.g., diameter; cross-sectional area) of the aperture 40 may be equal to or greater than the largest positive bean 42 so as to entirely uncover each positive bean 42. The ability to sequentially uncover progressively larger positive beans 42 may enable fine-tuned control of the flow of the fluid, or may be advantageous for well testing (e.g., flow testing) without shutting in the well or exchanging the choke trim 18, for example.

As shown in FIG. 17, in some embodiments, the plate 22 and/or the insert 24 may include one or more recesses 260 (e.g., grooves) and/or other features that facilitate pressure balancing and reduce face-to-face loading between the plate 22 and the insert 24. For example, the one or more recesses 260 may be formed in the plate 22 and may receive fluid (e.g., which acts as pressure balancing fluid and/or lubricating fluid) through a groove 262 that extends radially inwardly from an outer edge of the plate 22 to the one or more recesses 260. The one or more recesses 260 may reduce an area of contact between the plate 22 and the insert 24, and thus, may reduce a torque used to rotate the plate 22 relative to the insert 24. The one or more recesses 260 may not be through holes, but instead may be grooves that extend only partially across the plate 22 and/or the insert 24. In some embodiments, the one or more recesses 260 may be positioned at the center portion 53 of the plate 22 (or the center portion 49 of the insert 24, if present in the insert 24).

Figure 18:
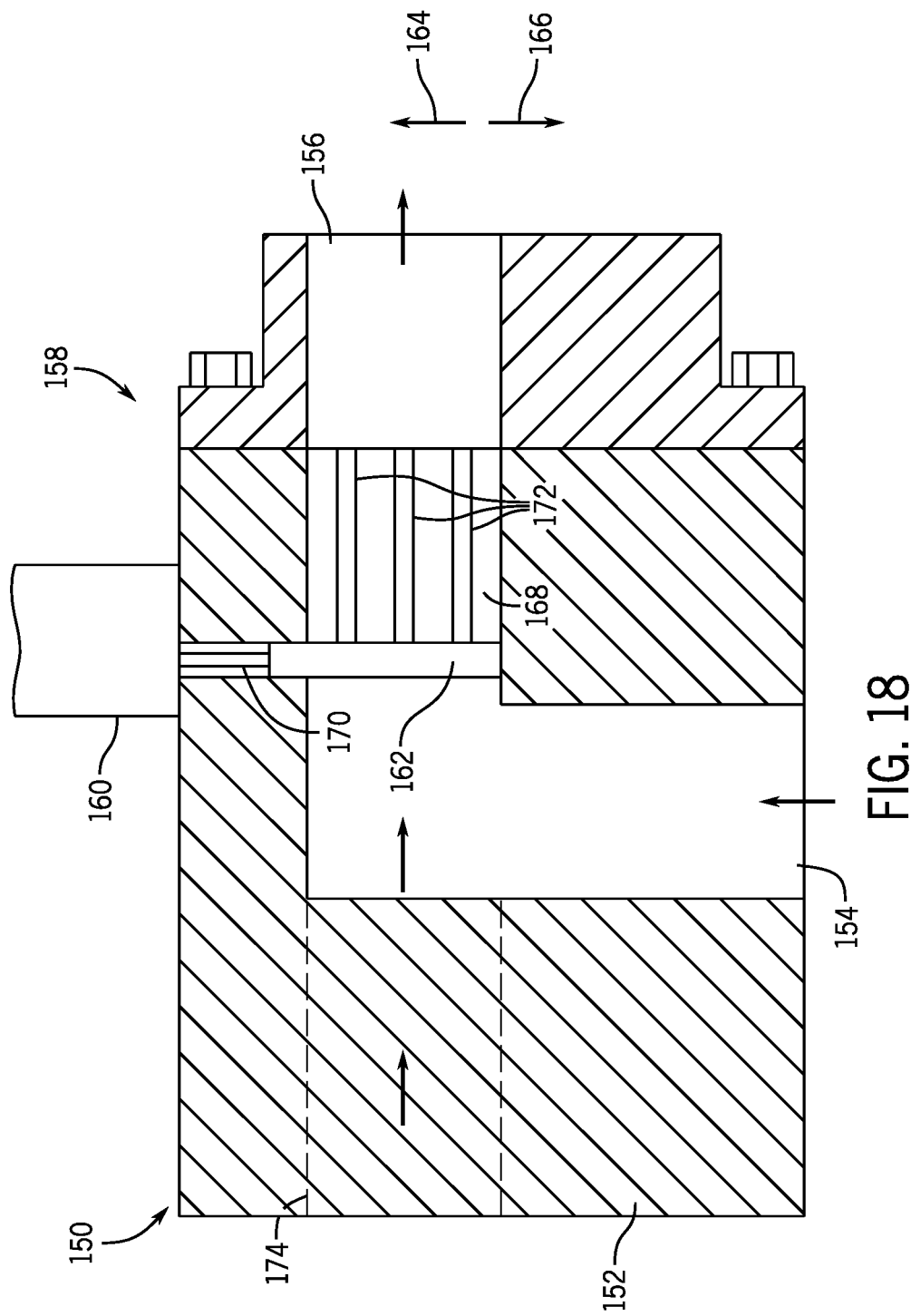
FIG. 18 is a cross-sectional view of a choke valve with a choke trim having a gate and an insert, wherein the plate is configured to slide relative to the insert, in accordance with an embodiment of the present disclosure.

FIG. 18 is a cross-sectional view of a choke valve 150 with a choke trim 158 having a gate 162 and an insert 168. The choke valve 150 may be part of a mineral extraction system (e.g., hydrocarbon-production or processing system, such as a subsea or a surface oil or gas well). As shown, the choke valve 150 includes a body 152 that defines an inlet 154 and an outlet 156. A fluid passing through the inlet 154 may be at relatively high pressures and may be carrying significant amounts of abrasive material (e.g., sand, ceramic, rock). For example, the fluid flow may carry significant amounts of sand from flow back after fracing a well. Without the present embodiments, this abrasive material may rapidly wear the choke valve and degrade its ability to control the flow of the fluid from the well.

As shown, the choke valve 150 includes the choke trim 158 disposed within the choke body 152 (e.g., right angled body, in-line body) and an actuator 160. The actuator 160 may modulate the flow of the fluid between the inlet 154 and the outlet 156 by adjusting the choke trim 158. The choke trim 158 includes the gate 162 that is configured to move vertically in a first direction 164 and a second direction 166 (e.g., slide back and forth) relative to the insert 168, which includes one or more positive beans 172. In operation, the gate 162 moves vertically in the direction 164 to uncover one or more of the positive beans 172 in the insert 168 (e.g., to move from a closed configuration to a partly-open or fully-open configuration), and the gate 162 moves vertically in the direction 166 to cover one or more of the positive beans 172 in the insert 168 (e.g., to move from the partly-open or fully-open configuration to the closed configuration).

The uncovering and covering of the positive beans 172 in the insert 168 changes the flow of the fluid between the inlet 154 and the outlet 156 of the choke valve 150. As illustrated, the actuator 160 is coupled to the gate 162 with a shaft 170. In some embodiments, the shaft 170 and/or other components that couple the actuator 160 to the gate 162 may be include coatings and/or coverings of erosion-resistant material, such as any of the erosion-resistant materials discussed herein. The actuator 160 may be a manual actuator (e.g., a wheel), an electro-mechanical actuator (e.g., an electric drive or motor), a hydraulic actuator (e.g., a fluid driven actuator), a pneumatic actuator (e.g., a pressure drive actuator), or other suitable type of actuator. Additionally or alternatively, an inlet 174 may be provided at another location of the body 152, such as in-line with the outlet 156.

It should be appreciated that any of the components disclosed herein, such as the plate 22, the insert 24, and/or the erosion-resistant portion 46 may be formed via an infiltrate process. In the infiltrate process, a superhard material (e.g., diamond) may be brazed onto a base material (e.g., tungsten carbide) of the component and/or diamond layers may be grown on the base material. These layers may include the base material in combination with the superhard material in varying proportions. For example, a layer closest to the base material may predominately be the base material with minimal superhard material. As additional layers are added or grown, the content of the superhard material relative to the base material increases until a final layer(s) is all superhard material. The infiltrate process may reduce a manufacturing cost associated with using the super hard material. In some embodiments, the positive beans 42, the aperture 40, and/or other features (e.g., the aperture 110, the recess 260) may be formed via the base material and then go through the infiltrate process to add the superhard material, which then lines the positive beans 42, the aperture 40, and/or the other features. In some embodiments, the positive beans 42, the aperture, and/or the other features may be drilled after the infiltrate process (e.g., this may be particularly useful for relatively small features that, if pre-drilled prior to the infiltrate process, might be filled via the infiltrate process, such as some or all of the small positive beans 42).

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is to cover all modifications, equivalents, and alternatives falling within the spirit and scope of the disclosure as defined by the following appended claims. It should be appreciated that any of the features of FIGS. 1-18 may be combined in any suitable manner. For example, the erosion-resistant portion shown and described with respect to FIGS. 6 and 7 may be included in any of the choke trims disclosed herein. As another example, the aperture in FIG. 16 and/or the recess of FIG. 17 may be included in any of the choke trims disclosed herein.

The invention claimed is:

1. A choke valve, comprising:
    a choke body; and
    a choke trim disposed in the choke body, wherein the choke trim comprises:
        an insert defining a plurality of positive beans, wherein:
            a first positive bean is located a first distance from a center of the insert; and
            a second positive bean is located a second distance from the center, the second distance different from the first distance; and
        a plate defining an aperture, wherein the plate is configured to contact and to rotate relative to the insert to cover and uncover one or more of the plurality of positive beans to adjust a fluid flow through the choke valve.

2. The choke valve of claim 1, wherein the plate comprises an erosion-resistant portion positioned along a perimeter that defines the aperture of the plate.

3. The choke valve of claim 2, wherein the erosion-resistant portion is positioned along a leading edge of the perimeter that defines the aperture of the plate, and the leading edge is configured to pass over the plurality of positive beans as the plate rotates relative to the insert.

4. The choke valve of claim 2, wherein the plate comprises a first material and the erosion-resistant portion comprises a second material that is harder than the first material.

5. The choke valve of claim 1, wherein the insert comprises an erosion-resistant portion positioned about only a portion of the plurality of positive beans that are positioned to be uncovered as the plate rotates relative to the insert from a closed configuration to a partly-open configuration.

6. The choke valve of claim 1, wherein the plate is positioned upstream from the insert relative to a direction of the fluid flow through the choke valve.

7. The choke valve of claim 1, wherein the plurality of positive beans is arranged in a circumferentially-offset configuration.

8. The choke valve of claim 1, wherein the plurality of positive beans progressively increase in size about a circumference of the insert.

9. The choke valve of claim 1, wherein the plurality of positive beans includes positive beans of different shapes, different sizes, or both.

10. The choke valve of claim 1, wherein when all of the plurality of positive beans are uncovered, the positive beans are aligned simultaneously with the aperture.

11. A choke trim for a choke valve, wherein the choke trim comprises:
    an insert defining a plurality of positive beans; and
    a plate defining an aperture and an erosion-resistant portion positioned along a perimeter of the aperture, wherein the plate is configured to rotate relative to the insert to adjust the choke trim between an open configuration in which the aperture is aligned with two or more of the plurality of positive beans simultaneously to enable a fluid flow across the choke trim and a closed configuration in which the aperture is not aligned with the plurality of positive beans to block the fluid flow across the choke trim.

12. The choke trim of claim 11, wherein the erosion-resistant portion is positioned along a leading edge of the perimeter of the aperture, and the leading edge is configured to pass over the plurality of positive beans as the plate rotates relative to the insert.

13. The choke trim of claim 11, wherein the plate comprises a first material and the erosion-resistant portion comprises a second material that is harder than the first material.

14. The choke trim of claim 11, wherein the insert comprises an additional erosion-resistant portion positioned about at least some of the plurality of positive beans.

15. The choke trim of claim 11, wherein the plurality of positive beans is arranged in a radially-offset configuration.

16. The choke trim of claim 11, wherein the plurality of positive beans is arranged in a circumferentially-offset configuration.

17. The choke trim of claim 11, wherein the plurality of positive beans progressively increase in size about a circumference of the insert.

18. The choke trim of claim 11, wherein the plurality of positive beans includes positive beans of different shapes, different sizes, or both.

19. A method of operating a choke valve, the method comprising:
    rotating, using an actuator of the choke valve, a plate defining an aperture in a first direction to adjust a choke trim to a partially open configuration in which the aperture is aligned with one or more of a plurality of positive beans of an insert to enable a fluid flow across the choke trim, while one or more other positive beans of the plurality of positive beans remain covered by the plate;
    using the actuator to further rotate the plate to a fully open configuration in which all of the plurality of positive beans are aligned with the aperture simultaneously; and
    rotating, using the actuator of the choke valve, the plate in a second direction to adjust the choke trim to a closed configuration in which the aperture is not aligned with the plurality of positive beans to block the fluid flow across the choke trim.

* * * * *